UNITED STATES PATENT OFFICE.

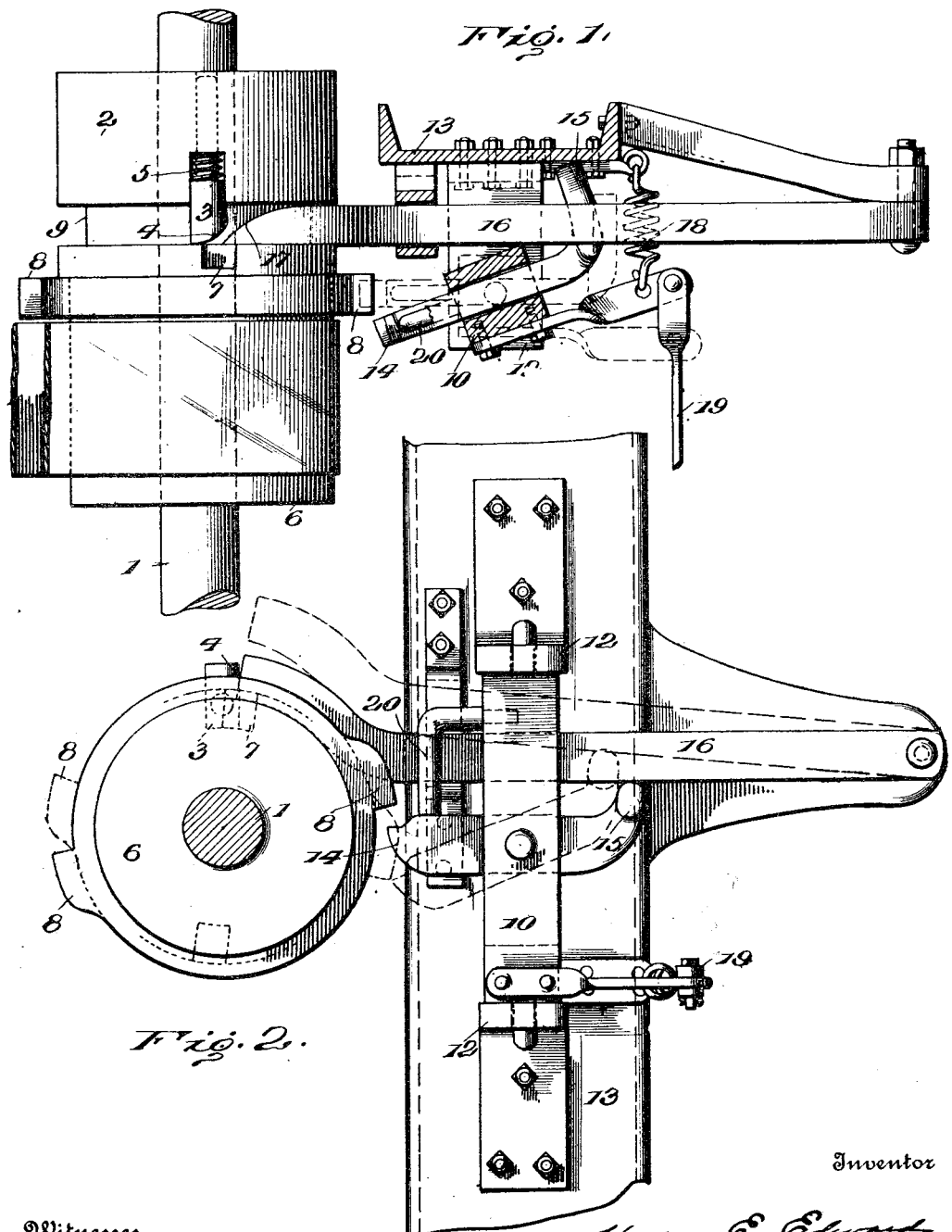

HARRY E. EDWARDS, OF NILES, OHIO, ASSIGNOR OF FIFTY-TWO ONE-HUNDREDTHS TO W. A. THOMAS, OF NILES, OHIO.

CLUTCH.

1,034,893.  Specification of Letters Patent.  Patented Aug. 6, 1912.

Application filed March 19, 1912. Serial No. 684,854.

*To all whom it may concern:*

Be it known that I, HARRY E. EDWARDS, of Niles, in the county of Trumbull and State of Ohio, have invented certain new and useful Improvements in Clutches; and I do hereby declare the following to be a full, clear, and exact description of the invention, such as will enable others skilled in the art to which it appertains to make and use the same.

The primary object of this invention is to provide a simple and highly efficient clutch between driving and driven members, and which will work with equal facility under varying loads, and which may be automatically or manually set for the coupling of the clutch members and which members will be automatically uncoupled.

The invention will be hereinafter fully set forth and particularly pointed out in the claims.

In the accompanying drawings, Figure 1 is a plan view. Fig. 2 is a view at right angles to Fig. 1.

Referring to the drawings, 1 designates a shaft which is shown as horizontally disposed, and upon this shaft is keyed a clutch member 2, which is shown in the form of a collar constituting the male portion of the clutch. In a socket of member 2 is a dog 3, which at one side has a curved face 4, said dog being normally held projected by a spring 5.

6 is the driving member of the clutch. It is shown in the form of a collar loose on shaft 1 on which it is designed to be constantly rotated by a pulley or gearing, not shown. In the face opposite the clutch member 2 I form a socket 7 to receive dog 3, and for this reason the member 6 constitutes the female portion of the clutch. I have shown member 6 as having a peripheral flange from which project two oppositely-disposed lugs 8. The two clutch members have an intervening space between their opposite faces formed by a reduced portion 9 of member 2.

10 designates a movable support at right angles to shaft 1. It is shown as vertically-disposed, being journaled at its upper and lower ends in bearings 12 secured to an upright 13. On this support is fulcrumed a trip-lever 14, which at its outer end has a lateral extension 15 which extends beneath a releasing lever 16 movable in the plane between the two clutch members. When the support 10 is moved on its axis to position the inner end of lever 14 in the path of lugs 8, such lever will be rocked when engaged by either of the lugs, and through its lateral extension 15 move the releasing lever out of its normal position and permit the dog to couple the two clutch members. When the trip-lever is freed of the lug the releasing lever will immediately resume its normal position and thereby be positioned to move the dog out of coupling position. For this purpose lever 16 is curved at 17 so that the curved face 4 will ride thereon and the dog be thereby disengaged from the member 6. If, however, the movable support for the lever remains in the position which places the trip-lever in the path of lugs 8, the releasing lever will be moved out of its normal position each time a lug engages the trip-lever. Normally support 10 is held in the full line position shown in Fig. 1 by a coil spring 18, and this spring is overcome when it is desired to position the trip-lever in the path of the lugs by a pull on a rod 19 connected to the support. This rod may be moved manually and immediately released, or it may be held for any desired time, dependent upon the necessity for keeping the clutch members coupled. Likewise, the rod may be automatically moved by any suitable means, as, for instance, a conveyer or elements carried thereby, the travel of which is under the control of the clutch or the driving member thereof. When the trip-lever is not positioned to be engaged by the lugs its movement under the weight of the releasing lever is limited by a stop 20, as shown in Fig. 2.

From what has been stated the operation will be readily understood. The pull on rod 19, sufficient to overcome the tension of spring 18, will position the trip-lever in the path of lugs 8, and upon being engaged by either of the latter, the dog-releasing lever 16 will be tripped, and the dog will immediately couple the two clutch members. As soon as the trip-lever is freed of the lug the releasing lever will be restored to its disengaging position, and if rod 19 is still held the releasing lever will be again tripped before it can uncouple the clutch members. As soon, however, as the rod 19 is released the trip-lever will be moved out of the path of the lugs, and in consequence the releasing lever will remain in its normal position and hold the dog out of engagement with the driving member.

It will be understood that changes may be made in the construction and arrangement of parts without departing from the spirit of my invention. When the device is used in a very warm position, when the temper of the spring 18 might be injuriously affected, a weight may be substituted therefor, and the means for shifting the trip mechanism into position to permit the clutch members to be coupled may be widely varied and under either manual or automatic control.

I have described the device as employed in connection with a horizontally-disposed shaft, but it is manifest that it may be used to equal advantage in connection with a vertically positioned shaft, but in that event a spring will be necessary to hold the trip-lever in its normal position, and some connection provided between the trip-lever and the releasing lever.

I claim as my invention:

1. A clutch comprising, in combination, a driving member, a driven member, a coupling element carried by one member and designed to interlock with the other member, a releasing member normally positioned to disengage said coupling element, a trip designed to be actuated by said driving member to move said releasing member out of its normal position, means for normally preventing said trip from being engaged by said driving member, and means for overcoming the last mentioned means.

2. A clutch comprising, in combination, a driving member, a driven member, a coupling element carried by one member and designed to interlock with the other member, a releasing member normally positioned to disengage said coupling element, a trip designed to be actuated by said driving member to move said releasing member out of its normal position, a movable support for said trip, means acting on said support for holding said trip inoperative, and means for moving said support to allow said trip to be actuated by the driving member.

3. A clutch comprising, in combination, a driving member, a driven member, a coupling dog carried by one member and designed to interlock with the other member, a releasing lever normally positioned to automatically uncouple said members, a trip-lever for moving said releasing lever out of uncoupling position, means carried by the driving member for actuating said trip-lever, and means for moving said trip-lever into and out of position to be engaged by the driving member.

4. A clutch comprising, in combination, a driving member carrying a lug, a driven member, a coupling dog carried by one member and designed to interlock with the other member, a releasing lever normally positioned to engage said dog to automatically uncouple said members, a trip-lever designed to be engaged by said lug and thereby move said releasing lever out of dog-engaging position, and means for moving said trip-lever into and out of the path of said lug.

5. A clutch comprising, in combination, a shaft, a driven member fast thereon, a constantly-operated driving member loose on said shaft and having oppositely-disposed lugs, one of said members having a dog and the other a recess to receive said dog, said dog having a curved face, a releasing lever having a curved portion with which said flange is designed to engage, a trip-lever designed to move said releasing lever out of its dog-engaging position, a pivoted support for said trip-lever, and means acting on said support for moving said trip-lever into and out of position to be engaged by said lugs.

In testimony whereof, I have signed this specification in the presence of two subscribing witnesses.

HARRY E. EDWARDS.

Witnesses:
H. J. WEBB,
E. R. EDWARDS.